April 8, 1958     H. T. BLUM     2,829,632
SLANTED TOOTH SAW BLADE FOR CUTTING STONE
Filed Sept. 18, 1956     2 Sheets-Sheet 1
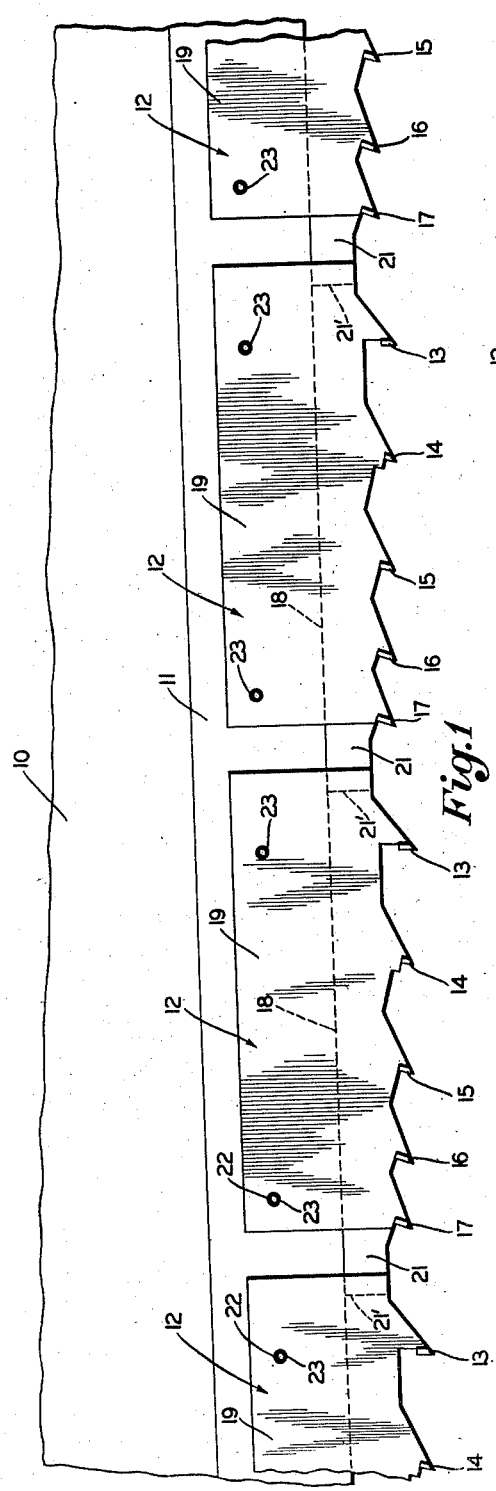
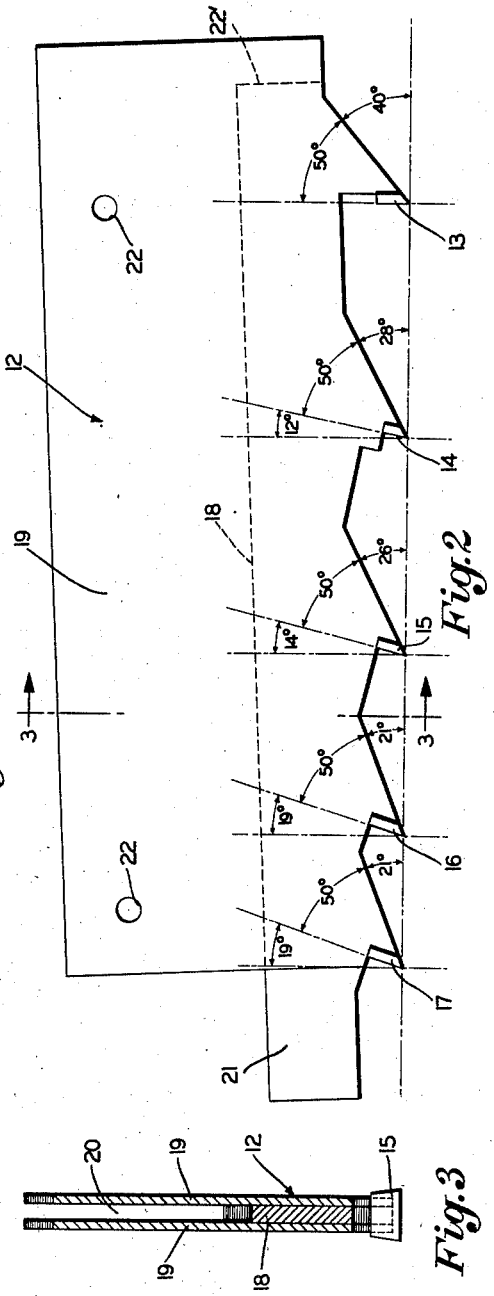
INVENTOR.
*Harold T. Blum*
BY *Frease & Bishop*
ATTORNEYS April 8, 1958   H. T. BLUM   2,829,632
SLANTED TOOTH SAW BLADE FOR CUTTING STONE
Filed Sept. 18, 1956   2 Sheets-Sheet 2

INVENTOR.
Harold T. Blum
BY
Frease & Bishop
ATTORNEYS

United States Patent Office 2,829,632
Patented Apr. 8, 1958

2,829,632

SLANTED TOOTH SAW BLADE FOR CUTTING STONE

Harold T. Blum, Millersburg, Ohio, assignor to The Briar Hill Stone Company, Glenmont, Ohio, a corporation of Ohio Application September 18, 1956, Serial No. 610,489

10 Claims. (Cl. 125—18)

The invention relates to saw blades for cutting stone and more particularly to improvements in the type of saw blade disclosed in my prior application, Serial No. 538,847, filed October 6, 1955, now Patent No. 2,775,236, dated December 25, 1956.

Saw blades of this type are designed for use in stone cutting machines such as disclosed in my prior Patents No. 2,720,199 and No. 2,720,200 dated October 11, 1955. These stone cutting machines are adapted for cutting large blocks of stone as received from the quarry into a plurality of slabs of desired thickness.

In such cases a plurality of saw blades with inserted hardened teeth are located in a gang saw frame which is continually moved in a circular path and at the same time continually moved vertically relative to the block of stone, cutting vertical kerfs therein, and separating the block into a plurality of slabs.

Since the gang saw blades are moved in a circular path, the saw teeth cut into the stone only during the forward movement of the blades, thus intermittently contacting the stone.

Each contact of the saw teeth with the stone produces a resultant shock, causing stresses and strains in the saw blade. In my prior Patent No. 2,775,236 above referred to, the saw teeth are arranged in similar groups, the spacing of the teeth progressively increasing from one end of each group to the other end thereof, so as to distribute the shock, stresses and strains throughout each cutting period.

In such saw blades the teeth are all vertical, whereby due to the circular movement of the blade, each tooth has a positive cutting action only from the time it contacted the stone until it reaches the bottom of its circular path.

As each vertical tooth continues to move upward from the bottom of its circular path in contact with the stone, it produces a scraping or braking action upon the stone rather than a cutting action, which requires considerable additional power.

The present invention contemplates the provision of a saw blade which overcomes the above-mentioned difficulties and disadvantages.

Another object of the invention is to provide a saw blade so constructed that the scraping or braking action of the saw teeth will be reduced to a minimum.

A further object is to provide such a saw blade in which the teeth are slanted at various angles.

A still further object is to provide a saw blade of this character in which the teeth are located in similar groups, the teeth in each group being variably spaced and slanted at various angles.

Another object of the invention is to provide a saw blade of the character referred to in which the positive cutting action of the majority of the teeth in each blade is increased, while the upward scraping or braking action thereof is reduced to a minimum.

And finally, it is an object of the invention to provide a saw blade construction which efficiently and economically attains the above objects.

These objects together with others which will be apparent to those skilled in the art, or which may be later referred to, may be attained by constructing the improved saw blade in the manner illustrated in the drawings and described in detail herein.

In general terms, the invention may be briefly described as comprising a saw formed of a flat plate of steel or the like having teeth upon one edge thereof, the teeth being located in similar groups throughout the length of the blade, the teeth in each group being spaced at progressively increasing distances from one end of the group to the other, and the teeth in each group being slanted at various angles from one end of the group to the other, with means for continuously moving the blade in a circular path, whereby the cutting action of the saw is greatly increased and the scraping or braking action and other shock, strains and stresses are reduced to a minimum.

Having briefly described the invention in general terms and pointed out the objects thereof, a preferred embodiment of the invention, illustrative of the best mode in which applicant has contemplated applying the principle, is set forth in detail in the following description and illustrated in the accompanying drawings, in which;

Fig. 1 is a side elevation of a portion of a saw blade embodying the invention, having a plurality of groups of variably spaced teeth, the teeth in each group being slanted at various angles;

Fig. 2 is an enlarged detached side elevation of one of the tooth insert units;

Fig. 3 is a transverse section on the line 3—3, Fig. 2;

Figures 4, 5:
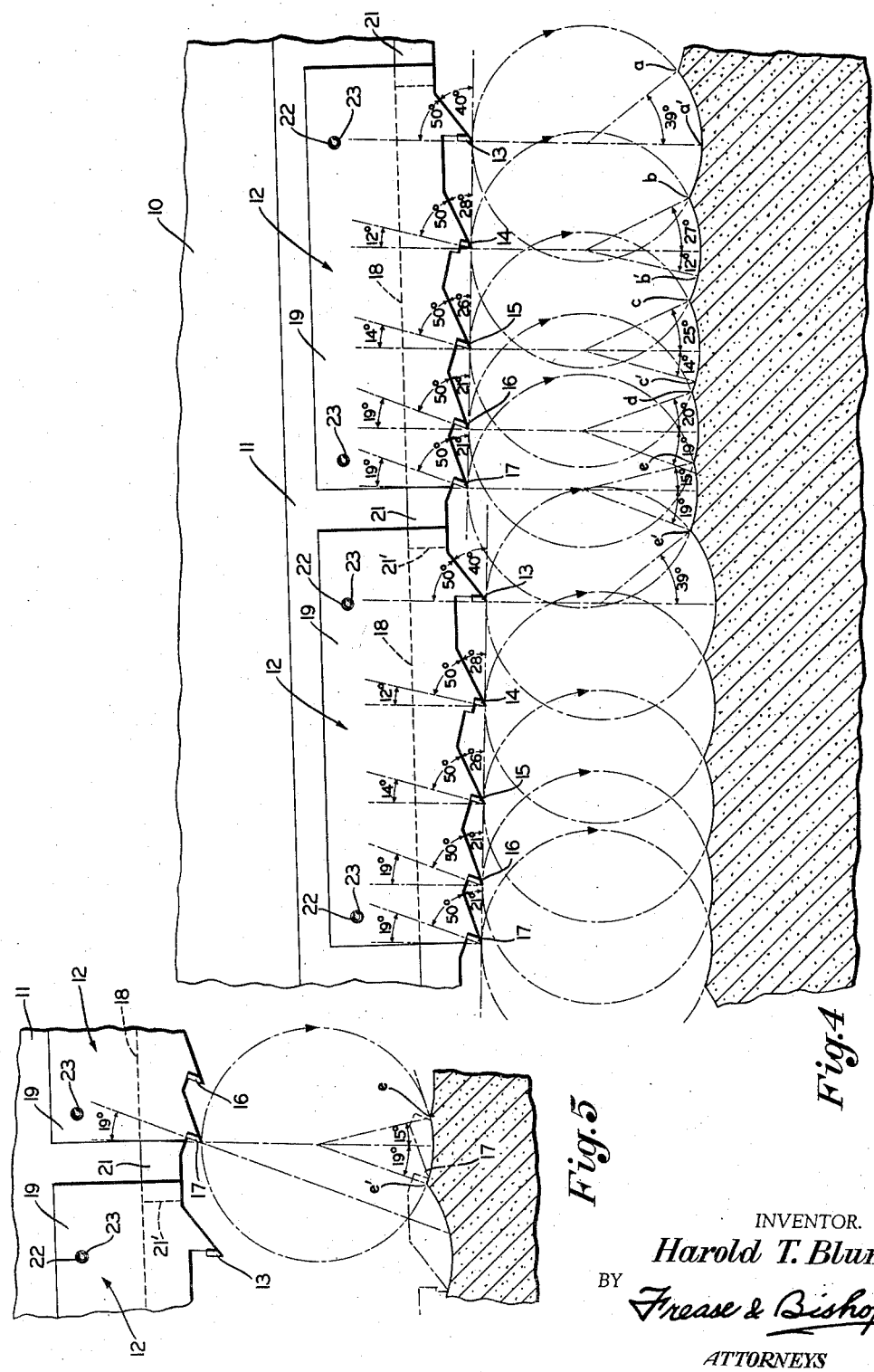
Fig. 4 is an enlarged, fragmentary side elevation of a portion of the saw blade showing two complete groups of the variably slanted spaced teeth and the manner in which the teeth cut a kerf in the stone.
Fig. 5 is a fragmentary elevation showing the action of the last tooth in each group.

Reference is now made to the embodiment of the invention illustrated in the drawings, in which the invention is shown as applied to the type of saw blade in my prior application, Ser. No. 587,417, filed May 25, 1956, now Patent No. 2,798,473 dated July 9, 1957 in which a relatively narrow, thin saw blade, with teeth inserts thereon is mounted below a relatively wide back-up plate or blade, so that the thin relatively narrow blade may be tightly stretched.

A small portion of the relatively wide back-up plate or blade is indicated at 10 and the relatively narrow saw blade is indicated at 11. Both the back-up blade and the saw blade may be mounted in a frame, as disclosed in my prior application, Ser. No. 587,417, now Patent No. 2,798,473 dated July 9, 1957 located in a stone cutting machine of the type of my prior patents above referred to, whereby the blade is continuously moved in a circular path.

The tooth insert units are indicated generally at 12, and each unit has a similar group of teeth thereon, whereby the insert units are entirely interchangeable throughout the length of the blade.

As shown in my copending applications above referred to, the teeth of each unit may be variably spaced so that only one tooth of each group will make contact with the stone at a given time, whereby the shocks, strains and stresses upon the blade will be distributed over a greater portion of the cutting period.

The teeth of each group are indicated at 13, 14, 15, 16 and 17, and the spacing of the teeth in each group is shown as progressively decreasing from the lead tooth 13 to the last tooth 17 of each group.

Each of the tooth insert units comprises an elongated metal plate 18, of the same gauge or thickness as the blade 11, and a pair of similar lighter gauge sheets 19 welded to opposite sides of the plate 18. The sheets 19 extend upward above the top edge of the plate 18, forming a channel 20 adapted to receive the blade 11.

One end of the plate 18 extends outward beyond the sheets 19, as indicated at 21, forming a tongue to be received in the groove 21' at the opposite end of a similar insert unit. Each of the teeth is in the form of an insert of carbaloy or other carbide or similar hardened material, which are welded upon the blade 12.

For the purpose of attaching the tooth insert units 12 to the blade 11, spaced apertures 22 are provided in the sheets 19 of each insert unit, and similarly spaced apertures are formed in the blade 11 to receive roll pins 23 or similar fastening means.

The carbaloy teeth 13 to 17 are ground at a maximum 50° included angle, as any sharper angle would weaken the carbaloy. The angles at which the teeth enter the stone are determined by the spacing of the teeth and the diameter of the circular path in which the blade travels.

The greatest angle (39°) through which a tooth travels during the positive cutting action determines the relief angle of the carbaloy teeth. The difference between the angles determines the amount that the face of the carbaloy tooth can be set off of vertical or at an angle to the vertical.

As shown in Fig. 4, the lead tooth 13 of each group is located in a vertical plane. In each complete circular movement of the tooth it will contact the stone at the point a, and the downward and forward positive cutting action will continue through a 39° angle to the bottom of the circular path as indicated at a'.

The scraping or braking action of this tooth will be from the point a' to the point b, which, as clearly shown on the drawings, is much less than the 39° angle of the positive cutting action.

The second tooth 14 of each group is slanted at an angle of 12° to the vertical. This tooth will contact the stone at the point b and pass through a 27° angle to the bottom of the circular path and will continue the positive cutting action through a further 12° angle to the point b'. The upward scraping or braking action will be very slight, extending only from the point b' to the high point c.

The third tooth 15 is slanted at an angle of 14° to the vertical, and will contact the stone at the high point c and will pass downwardly and forwardly through a 25° angle to the bottom of the circular path, and then will continue forwardly with the positive cutting action through a 14° angle to the point c', which is very close to the next high point d, so that the upward scraping or braking action of this tooth is very slight.

The fourth tooth 16 is slanted at an angle of 19° to the vertical. This tooth will contact the stone at the high point d and pass downward and forward through a 20° angle to the bottom of the circular path, and will continue the positive cutting action forwardly through a 19° angle which carries the tooth past the next high point e.

In like manner the rearmost tooth 17 of each group is slanted at an angle of 19° to the vertical, and will contact the stone at the high point e and the cutting action will extend through a 15° angle to the bottom of the circular path and through the additional 19° angle to the high point e' so that in both the fourth and fifth teeth of the group there is no upward scraping or braking action.

It will thus be obvious that the variable slanting and spacing of the several teeth in each group provides for a maximum of positive cutting action and a minimum of upward scraping or braking action, shock, stresses and strains throughout each cutting period. It will also be obvious that the variable slanting of the several teeth in each group would be of no benefit whatever without the variable spacing of the several teeth in each group and the substantially circular motion of the saw blade.

For the purpose of producing a forwardly and downwardly inclined kerf in the stone, the blade 11 may be inclined forwardly and downwardly as shown in the drawings. The several groups of teeth will thus be stepped downward and forward throughout the length of the blade, all of the teeth in each group being preferably located in a horizontal line as best shown in Fig. 4.

Although the invention has been illustrated and described as applied to a relatively narrow saw blade with relatively wide back-up blade, and with the teeth formed in groups separately attached to the blade, it should be understood that it is not necessary that the invention be limited to this specific type of saw blade.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A saw blade for use in a gang saw stone cutting machine having means therein for moving the saw blades so that each tooth edge of each saw blade is continuously moved in a circular path, said saw blade comprising an elongated straight blade having teeth along one horizontal edge thereof, said teeth being arranged in a plurality of identical groups, the teeth in each group being variously angled forwardly and downwardly and the forward and downward angles thereof conforming to the forward and downward angles of the teeth in each other group, whereby the positive cutting action of the teeth is greatly increased and the scraping and braking action of the teeth is greatly reduced.

2. A saw blade for use in a gang saw stone cutting machine having means therein for moving the saw blades so that each tooth edge of each saw blade is continuously moved in a circular path, said saw blade comprising an elongated straight blade having teeth along one horizontal edge thereof, said teeth being arranged in a plurality of identical groups, the teeth in each group being variously angled forwardly and downwardly and variously spaced and the forward and downward angles and spacing thereof conforming to the forward and downward angles and spacing of the teeth in each other group, whereby the positive cutting action of the teeth is greatly increased and the scraping and braking action of the teeth is greatly reduced.

3. A saw blade for use in a gang saw stone cutting machine having means therein for moving the saw blades so that each tooth edge of each saw blade is continuously moved in a circular path, said saw blade comprising an elongated straight blade having teeth along one horizontal edge thereof, said teeth being arranged in a plurality of identical groups, the teeth in each group being variously angled forwardly and downwardly and variously spaced and the forward and downward angles and spacing thereof conforming to the forward and downward angles and spacing of the teeth in each other group, the spacing of the teeth in each group progressively increasing from one end of each group to the other end thereof, whereby the positive cutting action of the teeth is greatly increased 4. A saw blade for use in a gang saw stone cutting machine having means therein for moving the saw blades so that each tooth edge of each saw blade is continuously moved in a circular path, said saw blade comprising an elongated straight blade having teeth along one horizontal edge thereof, said teeth being arranged in a plurality of identical groups, the teeth in each group being variously angled forwardly and downwardly and the forward and downward angles thereof conforming to the forward and downward angles of the teeth in each other group, the forward and downward angles of the teeth progressively increasing from one end of each group to the other end thereof, whereby the positive cutting action of the teeth is greatly increased and the scrapping and braking action of the teeth is greatly reduced.

5. A saw balde for use in a gang saw stone cutting machine having means therein for moving the saw blade so that each tooth edge of each saw blade is continuously moved in a circular path, said saw blade comprising an elongated straight blade having teeth along one horizontal edge thereof, said teeth being arranged in a plurality of identical groups, the teeth in each group being variously angled forwardly and downwardly and variously spaced and the forward and downward angles and spacing thereof conforming to the forward and downward angles and spacing of the teeth in each other group, the spacing of the teeth in each group progressively increasing from one end of each group to the other end thereof, and the forward and downward angles of the teeth progressively increasing from one end of each group toward the other end thereof, whereby the positive cutting action of the teeth is greatly increased and the scraping and braking action of the teeth is greatly reduced.

6. A saw blade for use in a gang saw stone cutting machine having means therein for moving the saw blades so that each tooth edge of each saw blade is continuously moved in a circular path, said saw blade comprising an elongated straight blade having teeth along one horizontal edge thereof, said teeth being arranged in a plurality of identical groups, the teeth in each group being variously angled forwardly and downwardly and variously spaced and the forward and downward angles and spacing thereof conforming to the forward and downward angles and spacing of the teeth in each other group, the spacing of the teeth in each group progressively increasing from one end of each group to the other end thereof, and the forward and downward angles of the teeth progressively increasing from the other end of each group toward said one end thereof, whereby the positive cutting action of the teeth is greatly increased and the scraping and braking action of the teeth is greatly reduced.

7. A saw blade for use in a gang saw stone cutting machine having means therein for supporting the saw blades in forwardly and downwardly inclined position and for moving the blades so that each tooth edge of each blade is continuously moved in a circular path, said saw blade comprising a straight blade having teeth along one longitudinal edge thereof, said teeth being arranged in a plurality of identical groups, said groups of teeth being horizontally disposed and progressively stepped downward toward the forward end of the blade, the teeth in each group being variously angled forwardly and downwardly and the forward and downward angles thereof conforming to the forward and downward angles of the teeth in each other group, whereby the positive cutting action of the teeth is greatly increased and the scraping and braking action of the teeth is greatly reduced.

8. A saw blade for use in a gang saw stone cutting machine having means therein for supporting the saw blades in forwardly and downwardly inclined position and for moving the blades so that each tooth edge of each blade is continuously moved in a circular path, said saw blade comprising a straight blade having teeth along one longitudinal edge thereof, said teeth being arranged in a plurality of identical groups, said groups of teeth being horizontally disposed and progressively stepped downward toward the forward end of the blade, the teeth in each group being variously angle forwardly and downwardly and variously spaced and the forward and downward angles and spacing thereof conforming to the forward and downward angles and spacing of the teeth in each other group, whereby the positive cutting action of the teeth is greatly increased and the scraping and braking action of the teeth is greatly reduced.

9. A saw blade for use in a gang saw stone cutting machine having means therein for supporting the saw blades in forwardly and downwardly inclined position and for moving the blades so that each tooth edge of each blade is continuously moved in a circular path, said saw blade comprising a straight blade having teeth along one longitudinal edge thereof, said teeth being arranged in a plurality of identical groups, said groups of teeth being horizontally disposed and progressively stepped downward toward the forward end of the blade, the teeth in each group being variously angled forwardly and downwardly and variously spaced and the forward and downward angles and spacing thereof conforming to the forward and downward angles and spacing of the teeth in each other group, the spacing of the teeth in each group progressively increasing from one end of each group to the other end thereof, whereby the positive cutting action of the teeth is greatly increased and the scraping and braking action of the teeth is greatly reduced.

10. A saw blade for use in a gang saw stone cutting machine having means therein for supporting the saw blades in forwardly and downwardly inclined position and for moving the blades so that each tooth edge of each blade is continuously moved in a circular path, said saw blade comprising a straight blade having teeth along one longitudinal edge thereof, said teeth being arranged in a plurality of identical groups, said groups of teeth being horizontally disposed and progressively stepped downward toward the forward end of the blade, the teeth in each group being variously angled forwardly and downwardly and variously spaced and the forward and downward angles and spacing thereof conforming to the forward and downward angles and spacing of the teeth in each other group, the spacing of the teeth in each group progressively increasing from one end of each group to the other end thereof, and the forward and downward angles of the teeth progressively increasing from one end of each group toward the other end thereof, whereby the positive cutting action of the teeth is greatly increased and the scraping and braking action of the teeth is greatly reduced.

References Cited in the file of this patent

UNITED STATES PATENTS

| | | |
|---|---|---|
| 462,482 | Forester | Nov. 3, 1891 |
| 2,736,312 | Goldman | Feb. 28, 1956 |
| 2,775,236 | Blum | Dec. 25, 1956 |

FOREIGN PATENTS

| | | |
|---|---|---|
| 3,821 | Great Britain | Oct. 2, 1876 |
| 1,093,114 | France | May 2, 1955 |